Patented Nov. 2, 1937

2,097,640

UNITED STATES PATENT OFFICE 2,097,640

QUATERNARY AMMONIUM COMPOUNDS

Henry Alfred Piggott, Blackley, Manchester, England, assignor to Imperial Chemical Industries Limited, a corporation of Great Britain No Drawing. Application March 23, 1934, Serial No. 717,113. In Great Britain March 27, 1933

18 Claims. (Cl. 260—99.12)

This invention relates to new textile assistants and their manufacture.

An object of the invention is to provide new chemical compounds useful as wetting agents, as agents for fixing or stripping dyes, for delustering of artificial silks, and as mordants for acid dyes on fur and the like. Another object is to provide processes for the manufacture of such compounds. Other objects will appear from the following specification.

These objects are achieved by my invention according to which I manufacture new textile assistants by introducing into a mono- or di-alkylarylamine a straight-chain hydrocarbon or acyl radical of not less than 10 carbon atoms in such a manner that it becomes attached to the aryl nucleus of the mono- or di-alkylarylamine either directly or through an oxygen atom or a second nitrogen atom, and I subsequently convert the product into the corresponding quaternary ammonium salt by interaction with dimethyl sulphate, benzyl chloride, ethylene chlorohydrin or other inorganic ester of an alkyl or aralkyl (including in that expression substituted alkyl and substituted aralkyl, e. g. hydroxyethyl, dihydroxypropyl, chlorobenzyl, bromobenzyl) group having not more than 7 carbon atoms.

My invention is illustrated by the following examples, in which parts are parts by weight.

*Example 1.*—To a well-stirred mixture of 40 parts of dimethylaniline and 40 parts of freshly-fused zinc chloride 30 parts of stearoyl chloride are slowly added, the temperature being kept below 50° by external cooling. When the addition is completed the mixture is stirred for a further 3 hours, and then decomposed by addition of 100 parts of water and distilled in steam to remove excess of dimethylaniline. 30 parts of conc. hydrochloric acid and 1500 parts of water are now added, and the mixture allowed to stand until no more solid separates. The solid product is then removed by filtration, and separated by warm dilute caustic soda from a little unreacted stearic acid. The product, p-dimethylaminostearophenone, may be purified by crystallization from light petroleum; it has M. P. 59–61° C. This product is heated with one-half its weight of dimethyl sulphate to 100° for 1 hour. Excess of dimethyl sulphate is then removed by heating with water, and addition of lime to the boiling solution until a neutral reaction is produced. The solution is then filtered and evaporated to dryness. A white crystalline residue of p-stearophenyltrimethylammonium methyl sulphate is thus obtained. It dissolves in water to a solution which has marked detergent properties, and which may be used in the delustring of artificial silk.

*Example 2.*—By replacing the stearoyl chloride in Example 1 with 22 parts of lauroyl chloride, p-dimethylaminolaurophenone, M. P. 45°, is formed. This is converted by heating with dimethyl sulphate as in Example 1 into a water-soluble methyl methosulphate with marked wetting-out properties.

*Example 3.*—A mixture of 60 parts of as-dimethyl-p-phenylenediamine and 120 parts of cetyl bromide are heated together at 120° C. for 1 hour, cooled and dissolved in 1000 parts of water. The solution is made strongly alkaline with caustic soda and the oily layer of liberated base separated off, and the aqueous layer extracted with ether. The oil is combined with the ethereal extract and dried over solid caustic soda. On removal of the ether there remains a basic oil which dissolves in mineral acids. This is converted by heating with dimethyl sulphate as in Example 1 into a water-soluble methyl metho-sulphate. By using a corresponding quantity of benzyl chloride in place of the dimethyl sulphate, a product of similar appearance and properties is obtained.

It will be seen from the preceding description and examples that my new textile assistants are quaternary ammonium salts of the general formula:

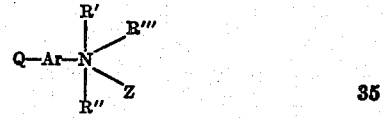

in which Q is a straight-chain aliphatic hydrocarbon or acyl radical of at least 10 carbon atoms linked directly or through an oxygen or nitrogen atom to the arylene residue Ar, R' is an alkyl group, R'' is an alkyl group or is the same as R'''. R''' is an alkyl or substituted alkyl or benzyl or substituted benzyl (R''' having not more than 7 carbon atoms), and Z is Cl, Br, I or —SO₃.OR'''. With reference to R'' it will be remembered that this may be hydrogen in the starting material (when that is, for example, a monoalkylarylamine); I believe, however, that in the subsequent conversion into quaternary salt any such hydrogen is replaced by the group R'''.

Although my products are believed to consist essentially of quaternary ammonium salts and are referred to as such in the specification and claims, the use of this term is not intended to exclude the possibility that in some cases ammonium salts which are not quaternary form part or even the whole of the product. The term "quaternary ammonium salts" as used here and in the claims is merely a convenient name for the products of the final treatment with the inorganic ester R'''Z.

My new textile assistants may thus be of the following types within the above general formula, viz, (1) $$R-Ar-N\begin{matrix}R'\\R'''\\Z\\R''\end{matrix}$$

(2) $$R-O-Ar-N\begin{matrix}R'\\R'''\\Z\\R''\end{matrix}$$

(3) $$R-N-Ar-N\begin{matrix}R'\\R'''\\Z\\R''\end{matrix}$$
$$\phantom{R-N-Ar-N}\overset{|}{G}$$

(4) $$X-C-Ar-N\begin{matrix}R'\\R'''\\Z\\R''\end{matrix}$$
$$\phantom{X-}\overset{\|}{O}$$

In these four formulae R is a straight-chain alkyl group having at least 10 carbon atoms; X is a straight-chain alkyl group having at least 9 carbon atoms; G is hydrogen or a hydrocarbon group; and Ar, R', R'', R''' and Z are as in the general formula above.

Of these types I prefer to use those represented by Formulae (2), (3), and (4). The compounds represented by (1) are more expensive to prepare. The ketones (4) have been found particularly useful.

In the examples the starting materials used are p-aminodimethylaniline and dimethylaniline. Useful products are also obtained by using other alkylated arylamines and derivatives, such as: diethylaniline, dipropylaniline, methylethylaniline, methylaniline, ethylaniline, ethyl-o-toluidine, methyl-o-toluidine, diamylaniline, m-chloro-dimethylaniline, p-aminodiethylaniline, m-aminodiethylaniline, o-aminodimethylaniline, p-hydroxydimethylaniline, o-hydroxydimethylaniline, methyl-β-naphthylamine, diethyl-β-naphthylamine, 1-dimethylamino-5-naphthol, and 1-diethylamino-8-naphthol.

For the production of the aminoketones from the mono- and di-alkylated arylamines there may be used, besides the acid chlorides of stearic, lauric and coconut oil acids, other acid chlorides of higher straight-chain fatty acids, such as myristic, oleic, palmitic and the like acid chlorides. A condensing agent, such as zinc chloride, may with advantage be used.

When the starting material is a hydroxy- or amino-derivative of a mono- or di-alkylated arylamine there may be used for the condensation any of the higher straight-chain alkyl chlorides, bromides, sulphates, or toluenesulphonates; e. g. cetyl chloride, the bromides of alcohols obtained by reduction of lauric acid, oleic acid, coconut oil acids, etc.

For the conversion into quaternary ammonium salts I prefer to use dimethyl sulphate or benzyl chloride, but there may also be used ethyl bromide, methyl iodide, propyl bromide, diethyl sulphate, p-chlorobenzyl chloride, and the like.

As many apparently widely different embodiments may be made without departing from the spirit and scope of my invention, I do not limit myself to the specific embodiments thereof except as defined in the following claims.

I claim:—

1. A process for producing complex nitrogen-containing compounds which comprises reacting a compound having the following general formula:

$$R-\langle\!\!\!\bigcirc\!\!\!\rangle-N\begin{matrix}R'\\R''\end{matrix}$$

wherein R represents a straight chain aliphatic hydrocarbon radical of from 10 to 18 carbon atoms which is connected to the phenylene nucleus by means of a grouping selected from the class consisting of ether, amino and ketone groupings, R' represents a lower alkyl group, and R'' represents a member of the class consisting of hydrogen and lower alkyls, with an inorganic ester containing a group selected from the class consisting of alkyl and aralkyl groups having not more than 7 carbon atoms.

2. The process of claim 1 wherein R represents one of the following groupings: $C_{10-18}H_{21-37}O$, $C_{10-18}H_{21-37}NH$, $C_{10-18}H_{21-37}CO$.

3. A process for producing complex nitrogen-containing compounds which comprises reacting a compound having the following general formula:

$$C_{10-18}H_{21-37}CO-\langle\!\!\!\bigcirc\!\!\!\rangle-N\begin{matrix}C_nH_{2n+1}\\C_nH_{2n+1}\end{matrix}$$

wherein $n$ represents an integer with an inorganic ester containing a group selected from the class consisting of alkyl and aralkyl groups having not more than 7 carbon atoms.

4. A process for producing complex nitrogen-containing compounds which comprises reacting p-dimethylamino-stearophenone with dimethyl sulfate.

5. Complex nitrogen-containing compounds having the following general formula:

$$R-\langle\!\!\!\bigcirc\!\!\!\rangle-N\begin{matrix}X\\R'\\R'''\\R''\end{matrix}$$

wherein R represents a straight chain aliphatic hydrocarbon radical of from 10 to 18 carbon atoms which is connected to the phenylene nucleus by means of a grouping selected from the class consisting of ether, amino and ketone groupings, R' represents a lower alkyl group, R'' represents a member of the class consisting of hydrogen and lower alkyls, R''' represents a group selected from the class consisting of alkyl and aralkyl groups having not more than 7 carbon atoms, and X represents the radical of a mineral acid.

6. The products of claim 5 wherein R represents one of the following groupings:

$$C_{10-18}H_{21-37}O, \quad C_{10-18}H_{21-37}NH, \\ C_{10-18}H_{21-37}CO.$$

7. Complex nitrogen-containing compounds having the following general formula:

$$C_{10-18}H_{21-37}CO-\langle\!\!\!\bigcirc\!\!\!\rangle-N\begin{matrix}X\\C_nH_{2n+1}\\R'''\\C_nH_{2n+1}\end{matrix}$$

wherein $n$ represents an integer, R''' stands for a group selected from the class consisting of alkyl and aralkyl groups having not more than 7 carbon atoms, and X represents the radical of a mineral acid.

8. Para-stearo-phenyl-trimethyl-ammonium-methyl-sulfate.

9. A process for the manufacture of new textile assistants which comprises the condensation of an alkylated arylamine with an acylhalide, RCOX, where R is a straight-chain aliphatic hydrocarbon radical having at least nine carbon atoms and X is a halogen atom, and subsequent conversion of the resulting alkylated aminoaryl alkyl ketone into a quaternary ammonium salt by interaction with an inorganic ester R'''Z, where R''' stands for a group selected from the class consisting of alkyl and aralkyl groups having not more than 7 carbon atoms, and Z stands for one member of the class consisting of Cl, Br, I, and ·SO₃OR'''.

10. A process for the manufacture of new textile assistants which comprises the condensation of a dialkylaniline with a fatty acid chloride having at least 10 carbon atoms in the molecule, and subsequent conversion of the resulting dialkyl-amino-aryl alkyl ketone into a quaternary ammonium salt by interaction with an inorganic ester, R'''Z, where R''' stands for a group selected from the class consisting of alkyl and aralkyl groups having not more than 7 carbon atoms, and Z stands for one member of the class consisting of Cl, Br, I, and ·SO₃OR'''.

11. A process as claimed in claim 10 in which R'''Z stands for dimethyl sulphate.

12. A process for the manufacture of new textile assistants which comprises the condensation of a dialkylaniline with stearic acid chloride, and subsequent conversion of the resulting dialkyl-aminostearophenone into a quaternary ammonium salt by interaction with an inorganic ester, R'''Z, where R''' stands for a group selected from the class consisting of alkyl and aralkyl groups having not more than 7 carbon atoms, and Z stands for one member of the class consisting of Cl, Br, I and ·SO₃OR'''.

13. A process as claimed in claim 12 in which R'''Z stands for dimethyl sulphate.

14. The step in the process for the manufacture of new textile assistants which comprises converting a compound of the formula:

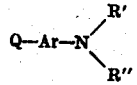

(where Q stands for a straight-chain aliphatic hydrocarbon radical of at least 10 carbon atoms, Q being linked through a bridging group which contains not more than two atoms, one of which is selected from the group consisting of oxygen and nitrogen atoms, to the arylene radical, Ar, and R' and R'' stand for members selected from the group consisting of hydrogen and alkyl, at least one being alkyl) into a quaternary ammonium salt by treatment with an inorganic ester, R'''Z, where R''' stands for a group selected from the class consisting of alkyl and aralkyl groups having not more than 7 carbon atoms, and Z stands for one member of the class consisting of Cl, Br, I, and ·SO₃OR''.

15. The step as claimed in claim 14 in which R'''Z stands for dimethyl sulphate.

16. A new textile assistant having the general formula:

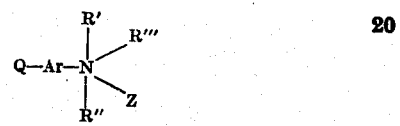

wherein Q stands for a straight chain aliphatic hydrocarbon radical of at least 10 carbon atoms which is attached through a bridging group which contains not more than two atoms, one of which is selected from the group consisting of oxygen and nitrogen atoms, to the arylene radical, Ar; R' and R'' stand for members selected from the group consisting of hydrogen and alkyl, at least one being alkyl, R''' stands for a group selected from the class consisting of alkyl and aralkyl groups having not more than 7 carbon atoms, and Z stands for one member of the class consisting of Cl, Br, I, and ·SO₃OR'''.

17. A new textile assistant of the formula:

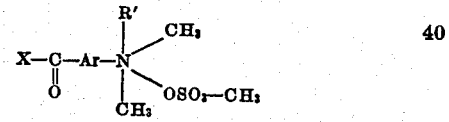

in which X is a straight chain alkyl group having not less than 9 carbon atoms, Ar is p-phenylene, and R' is an alkyl group having not more than 7 carbon atoms.

18. A new textile assistant as claimed in claim 17 in which

is the radical of stearic acid.

HENRY ALFRED PIGGOTT.